United States Patent
Tani et al.

(10) Patent No.: US 7,633,838 B2
(45) Date of Patent: *Dec. 15, 2009

(54) OPTICAL RECORDING DEVICE CAPABLE OF RECORDING FILE MANAGEMENT DATA INTO ANOTHER AREA OF AN OPTICAL DISC

(75) Inventors: Hironori Tani, Daito (JP); Ryusuke Noda, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 534 days.

This patent is subject to a terminal disclaimer.

(21) Appl. No.: 11/519,079

(22) Filed: Sep. 12, 2006

(65) Prior Publication Data
US 2007/0058497 A1    Mar. 15, 2007

(30) Foreign Application Priority Data
Sep. 13, 2005    (JP)    ............................ 2005-265776

(51) Int. Cl.
*G11B 21/08*    (2006.01)
(52) U.S. Cl. ................. 369/30.19; 369/30.05
(58) Field of Classification Search .............. 369/30.05, 369/30.19, 47.12, 47.14, 53.17, 53.14; 714/42, 714/54
See application file for complete search history.

(56) References Cited

U.S. PATENT DOCUMENTS

| | | | | |
|---|---|---|---|---|
| 4,788,672 A | * | 11/1988 | Toyooka et al. | .......... 369/30.09 |
| 5,107,481 A | * | 4/1992 | Miki et al. | ............... 369/53.21 |
| 5,825,739 A | * | 10/1998 | Saito et al. | ............... 369/47.13 |
| 6,141,772 A | * | 10/2000 | Hashimoto | .................... 714/16 |
| 6,370,096 B1 | * | 4/2002 | Hashimoto | ................. 369/53.2 |
| 6,724,705 B1 | | 4/2004 | Ko et al. | |
| 7,062,682 B2 | | 6/2006 | Ozaki | |
| 7,391,964 B2 | * | 6/2008 | Marumori et al. | ........... 386/126 |
| 2007/0058498 A1 | * | 3/2007 | Tani et al. | ................ 369/30.19 |
| 2007/0064547 A1 | * | 3/2007 | Kameda et al. | .......... 369/30.19 |

FOREIGN PATENT DOCUMENTS

| | | |
|---|---|---|
| JP | 2000-36161 A | 2/2000 |
| JP | 2003-263840 A | 9/2003 |
| WO | WO02/35338 | 5/2002 |

* cited by examiner

*Primary Examiner*—Tan X Dinh
(74) *Attorney, Agent, or Firm*—Crowell & Moring LLP (57) ABSTRACT

Before erasure of data, an optical head (6) reads file management data which manages user data from a file management data area "A" of an optical disk (2). A control unit (3) drives an optical head (6) to write the information into a specific area on the optical disc (2) to save the file management data. After saving the file management data, the optical head (6) records the data for erasing the file management data into the file management data area "A". According to a signal from the data erasure instruction cancel key or button (42, 52), after erasure of the file management data, the optical head (6) reads out the saved file management data from the specific area of the optical disc (2), and rewrite the file management data into the file management data area "A". Thus, even after data erasure of data, the user can use the data again before erasure by using the saved file management data.

7 Claims, 5 Drawing Sheets

FIG.1

FIG.2A
BEFORE SAVING FILE MANAGEMENT DATA

FIG.2B
AFTER SAVING FILE MANAGEMENT DATA (AFTER ERASURE OF DATA)

FIG.2C
AFTER RETURN OF SAVED DATA

FIG.3

FIG.4A BEFORE SAVING FILE MANAGEMENT DATA

FIG.4B AFTER SAVIN FILE MANAGEMENT DATA (AFTER ERASURE OF DATA)

FIG.4C AFTER RETURN OF SAVED DATA

FIG.5

OPTICAL RECORDING DEVICE CAPABLE OF RECORDING FILE MANAGEMENT DATA INTO ANOTHER AREA OF AN OPTICAL DISC

BACKGROUND OF THE INVENTION

1. Field of the Invention

The present invention relates to an optical disk recorder having a function of erasing data in an optical disk.

2. Description of the Related Art

Conventionally, an optical disc recorder has a function for formatting an optical disc further to functions for writing data into the optical disc and reproducing the data recorded in the optical disc. The optical disc to which data are recordable includes write-once optical discs into which the data can be written only once and rewritable optical discs into which data can be rewritten repeatedly by a predetermined times. As for the write-once optical disc, CD-R (CD Recordable), DVD-R (DVD Recordable), DVD+R (DVD Recordable) are exemplified. Furthermore, as for the rewritable optical disc, CD-RW (CD Rewritable), DVD-RW (DVD Rewritable), DVD+RW (DVD Rewritable), DVD-RAM (DVD Random Access Memory) are exemplified.

In the rewritable optical disk, new data can be overwritten over data written on the disc and the data already written on the disc can be erased. When a user erases the data recorded on the optical disk, a picture which renders the user to confirm execution of erasure is displayed on a monitor screen connected to the optical disk recorder to which the optical disk inserted or a personal computer which mounts the optical disc recorder. When the user selects erasure, the data recorded on the optical disk is erased, so that the user cannot use the erased data again. Thus, when the user erases data by mistake or persons other than the user erase data intentionally or inadvertently, the user cannot use the erased data again.

Besides, a magneto optical disc, from which recorded data can be erased, has the same problem as that of the optical disc that the data recorded on the disc cannot be used after erasing the data.

Therefore, International Publication WO2002/035338 discloses a data recorder having a data saving function for saving transmitted data when the data is transmitted from a host computer to the data recorder so as to utilize the data after erasing the data. The data recorder records data into a magneto optical disc which needs to be erased the data already recorded before writing new data. When writing new data, the data recorder erases the data already recorded in the optical disc and simultaneously requires transmission of the new data to be recorded to the host computer. When data transmission error is detected in the data transmission from the host computer, if data corresponding to the data already erased were saved in a data saving medium, the data can be returned to the magneto optical disc. However, when the data erased from the magneto optical disc is not saved in another recording medium, the data erased cannot be returned to the magneto optical disc. Furthermore, the disc recorder needs a recording medium for storing the data transmitted from the host computer, so that cost of the disc recorder is increased. Still furthermore, if the user erroneously instructed to erase the data, the data erased cannot be returned to the magneto optical disc, again.

On the other hand, Japanese Laid-Open Patent Publication No. 2003-263840 discloses a disc recorder which records data already recorded in an optical disc or a magneto optical disc into a backup memory provided in a disc cartridge when an electric power of the recorder is switched on. When error occurs in data writing, the data stored in the backup is rewritten into the optical disc or the magneto optical disc, thereby returning the backup data into to the optical disc or the magneto optical disc. Subsequently, new data to be recorded are further recorded into the optical disc or the magneto optical disc. However, when the data were erased according to the instruction by the user, the data erased cannot be returned to the optical disc or the magneto optical disc.

Japanese Laid-Open Patent Publication No. 2000-036161 discloses a recording medium which stores overwrite protection information for preventing undesired overwriting or erasing of the data recorded on the recording medium. The recording medium has a step for checking whether the overwrite protection information exists or not when writing or erasing the data, and restricts to write or erase the data on the recording medium corresponding to the overwrite protection information. However, when the data were erased according to the instruction by the user, the data erased cannot be returned to the recording medium.

SUMMARY OF THE INVENTION

In order to solve the above-mentioned problems, the present invention intends to provide an optical disk recorder in which after data in an optical disk is erased, the user can use the data before erasure again.

An optical disk recorder in accordance with an aspect of the present invention comprises: a data writing means for writing data into an optical disk; a data reading means for reading out data from an optical disk; a data erasure instruction means, which is operated by a user, to instruct to perform erasure of data of an optical disc to the data writing means; and a data erasure instruction cancel means, which is operated by the user, to instruct to cancel the data erasure instruction to the data writing means.

When the data erasure instruction means instructs to perform erasure of data of an optical disc, the data reading means reads out file management data from the file management data area of the optical disc before erasing of the file management data, and the data writing means writes the file management data into a specific area except the file management data area so as to save the file management data, and subsequently the data writing means write predetermined data for erasing the file management data originally written in the file management data area.

When the data erasure instruction cancel means instructs to cancel the erasure of the data, the data reading means reads out the file management data saved in the specific area of the optical disc, and the data writing means writes the file management data read out from the specific area into the file management data area where the file management data were originally written.

With such configuration, since the file management data written in the file management data area are saved into the specific area except the file management data area prior to the erasure of the data, even when the data written in file management data area are erased corresponding to the instruction to perform erasure of the data of the optical disc, the user data written in the user data area can be accessed with using the saved file management data. Thus, even when a person other than the user instructs erasure of the data to the optical disk recorder and the data in the file management data area is erased, since the file management data is saved, the user data can be used with using the saved file management data again. Furthermore, since the file management data are saved in the specific area on the optical disc, the saved file management data can be returned until the specific area is overwritten by new data. Still furthermore, the file management data is saved in the specific area of the same optical disc, so that another recording medium for saving the file management data is not needed, and thereby cost reduction of the optical disc recorder 1 due to reduction of number of elements constituting the optical recorder can be realized.

DETAILED DESCRIPTION OF THE EMBODIMENTS

First Embodiment

An optical disk recorder in accordance with a first embodiment of the present invention will be described with reference to FIG. 1 to FIG. 3. An optical disk in accordance with the first embodiment of the present invention is, for example, a DVD+RW and the optical disk recorder is, for example, a DVD recorder for recording and/or reproducing video, music and sound.

Figure 1:
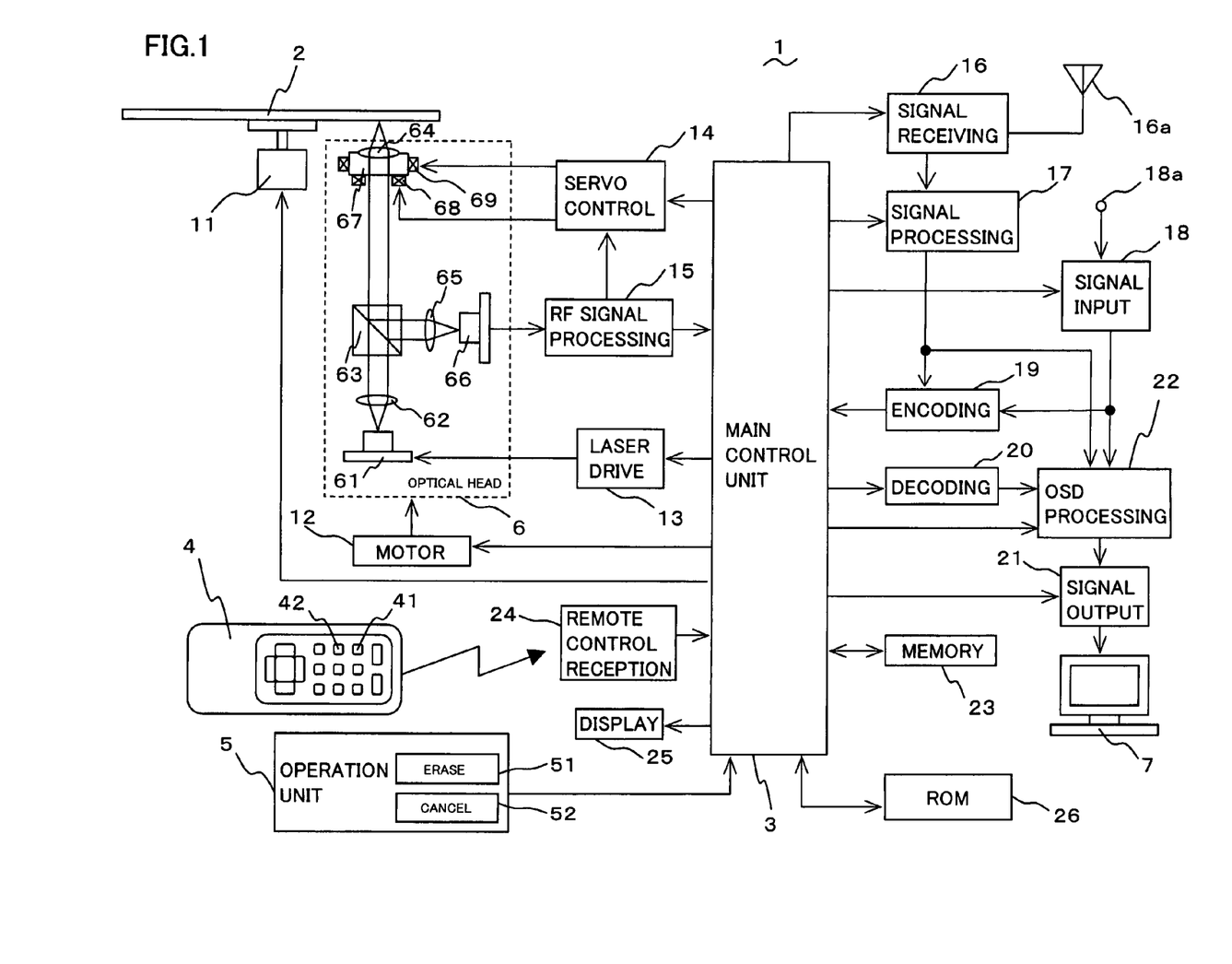
FIG. 1 is a block diagram showing a configuration of an optical disk recorder in accordance with a first embodiment of the present invention.

FIG. 1 shows a configuration of an optical disk recorder 1. The optical disk recorder 1 serves to record data into an optical disk 2 and to read date from the optical disk 2. The optical disc recorder 1 has a main control unit 3 comprised of a CPU and so on for controlling entire of the optical disk recorder 1, a remote controller 4 and an operation unit 5 which is operated by a user to issue instructions to the main control unit 3 and an optical head 6 for recording and/or reading data. The optical disk recorder 1 is connected to a monitor display apparatus 7 for displaying a menu picture to render the user for selecting operations and connected to a RAM 9 for transferring data through a connection unit 8.

The optical disk 2 is inserted into a disk insertion unit (not shown) and attached to a spindle motor 11. The spindle motor 11 is rotationally driven by the main control unit 3 and rotates the optical disk 2 attached thereto. A driving motor 12 is formed of a linear motor and moves the optical head 6 in a radial direction of the optical disk 2 with facing a recording face of the optical disc 2.

The optical head 6 records data into the optical disk 2 by forming a pit on the recording face of the optical disk 2 and reads data recorded in the optical disk 2 by detecting the pit formed on the recording face of the optical disk 2. The optical head 6 comprises a semiconductor laser 61, a collimator lens 62, a beam splitter 63, an objective lens 64, a condenser lens 65 and a light receiving element 66.

The semiconductor laser 61 is driven by a laser driving unit 13 to emit a light beam. The light beam emitted from the semiconductor laser 61 is focused and irradiated on the optical disk 2 through the collimator lens 62, the beam splitter 63 and the objective lens 64. The light reflected on the optical disk 2 is focused on the light receiving element 66 through the objective lens 64, the beam splitter 63 and the condenser lens 65. The objective lens 64 is held on a lens holder 67 and moved due to magnetic action of a focusing coil 68 and a tracking coil 69 which are driven and controlled by a servo control unit 14 in a direction vertical to the recording face of the optical disk 2 and in the radial direction of the optical disk 2. With the movement of the objective lens 64, position of a focused point and beam spot diameter of the light which is emitted from the semiconductor laser 61 and focused on the optical disk 2 are adjusted. A light receiving face of the light receiving element 66 is divided into a plurality of areas and each areas of the light receiving surface outputs an electrical signal according to received light intensity.

The optical head 6 with such configuration radiates the light beam emitted from the semiconductor laser 61 to the optical disk 2, thereby altering a recording layer of the optical disk 2 to form a pit on the optical disk 2. Reflectance of the light is changed at the altered portion of the recording layer. The optical head 6 radiates the light beam emitted by the semiconductor laser 61 to the optical disk 2 and the light receiving element 66 receives the light reflected on the optical disk 2, thereby detecting the pit formed on the recording layer of the optical disk 2. For detecting the existence of the pits on the recording layer of the optical disc, intensity of the light beam emitted from the semiconductor laser 61 is decreased so as not to alter the recording layer of the optical disk 2.

The laser driving unit 13 controls timing for emitting the light beam and intensity of the light beam emitted from the semiconductor laser 61 based on the signal from the main control unit 3. An RF signal processing unit 15 generates and outputs an RF signal (reflection intensity signal), a focusing error signal and a tracking error signal based on output signals from the light receiving element 66. The servo control unit 14 drives the focusing coil 68 and the tracking coil 69 based on the focusing error signal and the tracking error signal from the RF signal processing unit 15, thereby moving the objective lens 64 to control position of the focused point of the light beam irradiated from the semiconductor laser 61 onto the optical disk 2.

A broadcast signal reception unit 16 receives a TV broadcast signal via an antenna 16a based on a signal from the main control unit 3 so that receiving frequency of it is tuned to frequency of the TV broadcast signal delivered from a broadcast station. A received signal processing unit 17 demodulates the TV broadcast signal received by the broadcast signal reception unit 16 to generate audio signals and visual signals corresponding to a signal from the main control unit 3. A signal input unit 18 is operated corresponding to a signal from the main control unit 3. Various signals representing data such as video, music and documents are inputted to the signal input unit 18 from external equipment (not shown) such as a video camera, a digital camera and a personal computer.

An encoding unit 19 encodes the audio signals and the visual signals generated by the received signal processing unit 17 and the signals inputted from the signal input unit 18 into a predetermined format based on a signal from main control unit 3 so as to record these signals on the optical disk 2 as encoded data. A decoding unit 20 decodes the encoded data read from the optical disk 2 corresponding to a signal from the main control unit 3.

A signal output unit 21 outputs the audio signals and visual signals generated by the received signal processing unit 17, the signals inputted from the signal input unit 18 and the signals decoded by the decoding unit 20 to external equipment such as the monitor 7, a speaker and a personal computer (not shown) based on a signal from main control unit 3. An OSD (On Screen Display) processing unit 22 superimposes an on-screen image signal for displaying an on-screen image on the monitor 7 on the video signals decoded by the received signal processing unit 17, the signals inputted from the signal input unit 18 and the signals decoded by the decoding unit 20 corresponding to a signal from the main control unit 3.

A memory 23 temporarily stores code data to be recorded in the optical disc 2 and code data read from the optical disk 2 based on a signal from the main control unit 3. In addition, the memory 23 stores graphical data to generate an onscreen picture.

The remote controller 4 is operated by the user to instruct various operations of the optical disk recorder 1 including selection of a receiving channel of the TV broadcast signal, recording of data such as video, music and documents on the optical disk 2 and reproduction of the data stored on the optical disk 2. The remote controller 4 has various operation keypads operated by the user to instruct various operations of the optical disk recorder 1 and by operating each of the various operation keys, outputs an infrared code signal associated with the respective operation. The various operation keypads include a data erasure key 41 serving as a data erasure instruction means and a data erasure cancel key 42 serving as a data erasure cancel instruction means. When the user presses the data erasure key 41, the remote controller 4 instructs the main control unit 3 to erase the data recorded on the optical disk 2. When the user presses the data erasure cancel key 42, the remote controller 4 instructs the main control unit 3 to cancel the data erasure instruction.

A remote controller reception unit 24 receives the infrared signal transmitted from the remote controller 4, converts the signal into an electrical signal and outputs the electric signal corresponding to the operation of the remote controller 4 to the main control unit 3. A display unit 25 is provided in the main unit of the optical disk recorder 1 and displays the operation performed by the remote controller 4 and an operating state of the optical disk recorder 1 thereon. A ROM (Read Only Memory) 26 stores an operation program of the main control unit 3 therein.

The operation unit 5 has various operation buttons operated by the user to instruct various operations of the optical disk recorder 1 including recording of data such as video signals on the optical disk 2 and reproduction of the data recorded on the optical disk 2 and by operating each of the various operation buttons, outputs a signal associated with the respective operation to the main control unit 3. The operation unit 5 includes a data erasure button 51 serving as a data erasure instruction means and a data erasure cancel button 52 serving as a data erasure cancel instruction means. When the user presses the data erasure button 51, an instruction to erase the data recorded on the optical disk 2 is issued to the main control unit 3. When the user presses the data erasure cancel button 52, an instruction to cancel the data erasure instruction is issued to the main control unit 3.

The monitor display apparatus 7 displays various menu pictures on a screen thereof based on a signal from the main control unit 3. The monitor display apparatus 7 has an item for instructing data erasure in a menu. When the user operates the remote controller 4 or the operation unit 5 and selects the item for instructing data erasure in the menu, the instruction to erase the data recorded on the optical disk 2 is issued to the main control unit 3. The monitor display apparatus 7 further has an item for canceling the data erasure instruction. When the user operates the remote controller 4 or the operation unit 5 and selects the item for canceling the data erasure instruction, the instruction to cancel the data erasure instruction is issued to the main control unit 3. Through the above-mentioned operations, the monitor display apparatus 7, the main control unit 3, the remote controller 4 and the operation unit 5 constitute the data erasure instruction means and the data erasure cancel instruction means.

Data writing into the optical disk 2 is performed by encoding the audio signals and the visual signals generated by the received signal processing unit 17 or the signals inputted from the signal input unit 18 by the encoding unit 19 and forming pits on the optical disk 2 having predetermined lengths and arrangement corresponding to the encoded data by the optical head 6 on the basis of a signal from main control unit 3.

Data reproduction from the optical disk 2 is performed by detecting the pits formed on the optical disk 2 by the optical head 6 and determining lengths and arrangement of the pits in the main control unit 3 on the basis of the RF signals outputted from the signal processing unit 15 to read the encoded data.

Recording tracks are formed on the optical disk 2 concentrically or convolutedly with a predetermined pitch. Each recording track is further divided radially into equal sectors as minimum recording units. In each sector, an address value for identifying each sector is previously recorded by the pits. Through the above-mentioned operations, the optical head 6 and the main control unit 3 constitute a data writing means and a data reading means.

In the writing/reading operation of encoded data, the main control unit 3 renders the optical head 6 to radiate light beam on the optical disk 2 and to receive the reflected light as well as drives the spindle motor 11 to rotate the optical disk 2. Furthermore, the main control unit 3 detects the address value of each sector to identify the sector and performs writing or reading the encoded data in units of sectors based on the pits detected by the optical head 6 or the RF signals outputted from the signal processing unit 15.

Figure 2A:
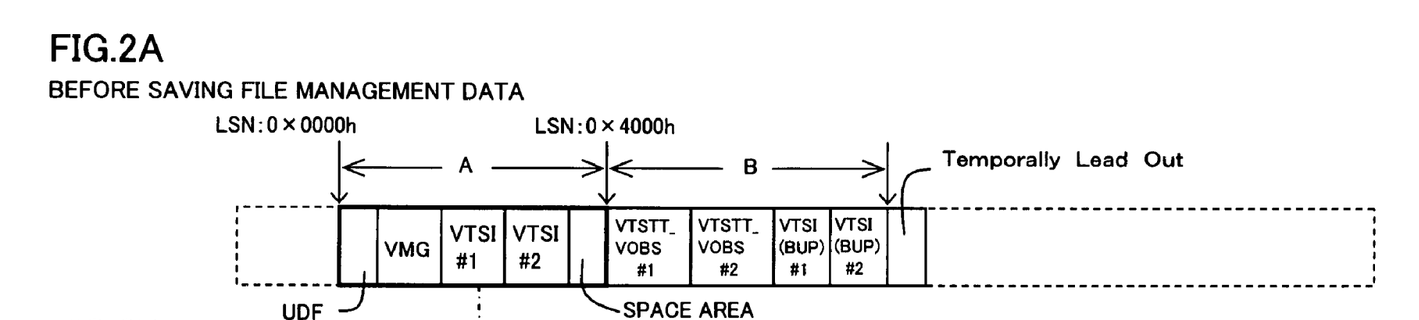
FIGS. 2A to 2C are diagrams each showing a data structure in an optical disk (DVD+RW) used in the above optical disk recorder in the first embodiment.
Figure 2B:
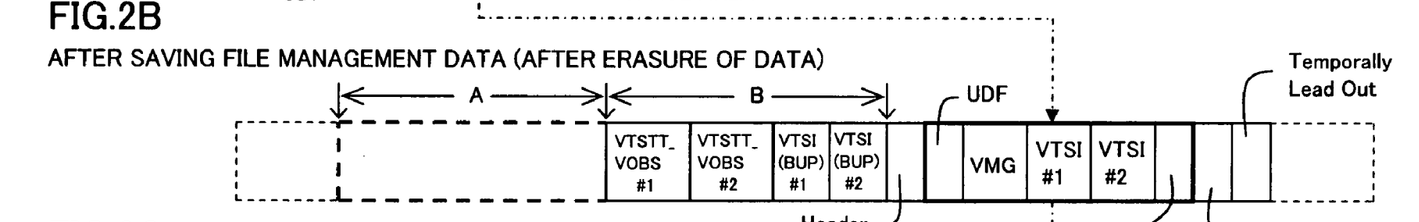
Figure 2C:
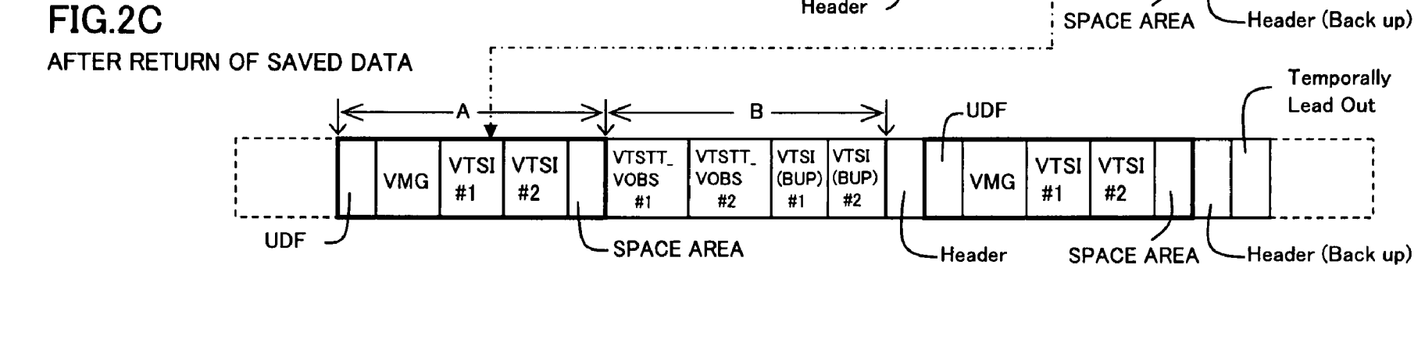

FIGS. 2A to 2C each shows a data structure of a DVD+RW in VR (Video Recording) mode in which data is recorded by the optical disk recorder 1 configured as above. These figures show changes in the data structure before and after saving of data and data structure after return of the saved data. The DVD+RW is an optical disk in which data can be rewritten any number up to a predetermined number of times. With using an optical disk formatted in the DVD+RW form, the user can make a DVD video which can be reproduced by a DVD video player and make an optical disk used in a DVD-ROM drive in a personal computer. The DVD+RW can be used in a DVD+RW-enabled video recorder. With the DVD+RW (DVD+VR) in which data is recorded in the VR mode, editing of animated data and addition of video data can be carried out and the user need not make finalization. Finalization refers to processing for prohibiting writing of additional data. Finalization also refers to processing for making media recognizable in general DVD players and DVD-ROM drives.

The optical disk 2 has a user data area "B" for storing user data therein, a file management data area "A" for storing file management data to control the user data, and a terminal area showing a terminal end of all data. The file management data area "A" extends from logical sector number LSN 0×0000h to 0×3999h (hexadecimal number). That is, the size of the file management data area "A" is 0 ×4000h. The user data area "B" starts from LSN 0×4000h and stores the user data such as video data. The terminal area is located outside the user data area "B".

FIG. 2A shows the data structure after the user records, for example, two titles of video data. When the user operates the optical disk recorder 1 to record one title of video data, the optical head 6 records VTS (Video Title Set) on the optical disk 2 corresponding to a signal from the main control unit 3. In addition, FIG. 2A shows the data structure when the user data and so on are recorded on the optical disk 2 in which the user data and the file management data are erased by formatting or erasing all data.

The VTS is a block of program information comprised of VTSI (Video Title Set Information), VTSM_VOBS (Video Objects for Video Title Set Menu), VTSTT_VOBS (Video Objects for Titles in a Video Title Set) and VTSI (BUP). The VTSI is control information of VTS, which is formed of one file named as VTS_##_0.IFO. The VTSM_VOBS is material information of a menu picture unique to the program, which is formed of one file named as VTS_##_0.VOB. The material of the menu picture includes still pictures or moving pictures. The menu picture unique to the program enables menu selection unique to the program. The VTSTT_VOBS is video information, which is formed of a plurality of files named as VTS_##_@.VOB. The VTSI (BUP) is a backup which is formed of one file named as VTS_##_0.BUP. Although the VTSM_VOBS is not necessarily required, the VTSI, the VTSTT_VOBS and the VTSI (BUP) are necessary for reproducing the video data. An integer of 01 to 99 fits in ## and an integer of 1 to 9 fits in @. The VTSI constitutes file management data and is recorded into the file management data area "A". The VTSM_VOBS (not shown), the VTSTT_VOBS and the VTSI (BUP) constitute user data and are recorded into the user data area "B". In FIGS. 2A to 2C, numerals added to the VTSI, the VTSTT_VOBS and the VTSI (BUP) designates numbers of titles recorded on the optical disk 2.

When second video data are additionally recorded, new VTSI#2 is recorded into the file management data area "A" and new VTSTT_VOBS#2 and VTSI (BUP)#2 are recorded into the user data area "B". The new VTSI#2 is recorded subsequent to the VTSI#1 which was written in the first writing. The new VTSTT_VOBS#2 is recorded subsequent to the VTSTT_VOBS#1 written in the first writing and the new VTSI (BUP)#2 is recorded subsequent to the recorded VTSI (BUP)#1. When there is no space in the user data area "B" and/or the file management data area "A" for newly writing data into the optical disk, or when the user instructs erasure of the written user data, the new user data and/or file management data may be overwritten over the written user data and/or file management data.

The file management data is further comprised of, for example, file system information such as UDF (Universal Disk Format) and VMG (Video Manager) and is stored into the file management data area "A". Based on a signal from the main control unit 3, the optical head 6 records the VMG from a particular address and the file system information is written between a head of the file management data area "A" and the area in which the VMG is stored. The optical head 6 further writes temporally lead-out constituting the terminal area into an area outside the final sector among the sectors into which all data including the file management data and the user data are written. The temporally lead-out indicates the terminal position of all data.

The VMG is formed of VMGI (Video Manager Information), VMGM_VOBS (Video Objects for Video Manager Menu) and VMGI (BUP). The VMGI is control information of the whole video area, which is formed of one file named as VIDEO_TS.IFO. The VMGM_VOBS is formed of one file named as VIDEO_TS.VOB and contains material information of the menu picture displayed on the monitor display apparatus first when DVD is reproduced. The materials of the menu picture contain still pictures or moving pictures. The menu picture enables menu selection by the user. The VMGI (BUP) is a backup of the VMGI, which is formed of one file named as VIDEO_TS.BUP. Although the VMGM_VOBS is not necessarily required, the VMGI and the VMGI (BUP) are necessary for reproducing the video.

FIG. 2B shows the data structure in the DVD+RW in the VR mode after the file management data is saved. When the main control unit 3 recognizes the data erasure instruction from the data erasure button 51 or the like, the main control unit 3 reads all data in the file management data area "A" with using the optical head 6. Furthermore, the main control unit 3 drives the optical head 6 so as to write all the read data and a backup of a header onto the temporally lead-out in the area outside the user data area "B", thereby saving the data. The optical head 6 further write a new temporally lead-out in an area outside the backup of the header and the saved data. The data read out from the file management data area "A" includes VTSI #1 and #2 for managing the user data, VMG, and system file data such as UDF. The data further includes data of space area, and so on. After saving of the data, the main control unit 3 records data for erasing file management data in the file management data area "A" with using the optical head 6. For example, the main control unit 3 overwrites the existing data by writing a value 0 or a value 1 in the file management data area "A", entirely or randomly. Thus, even when the user erroneously instructs erasure of the data to the optical disk recorder 1 and the data is erased, the user data are not erased and the file management data are saved, so that it is possible to access to the user data again by using the saved file management data. Furthermore, since the file management data are saved in a specific area an the optical disc 2, the file management data can be returned until new data are overwritten on the saved file management data in the optical disc 2. Still furthermore, the file management data is saved in the specific area of the same optical disc 2, so that another recording medium for saving the file management data is not needed, and thereby cost reduction of the optical disc recorder 1 due to reduction of number of elements constituting the optical recorder 1 can be realized.

FIG. 2C shows the data structure in the DVD+RW in the VR mode after the file management data is returned. The header written in the area outside the user data area "B" includes information of addresses of the file management data area "A", addresses of the area into which data are saved, and an address of the temporally lead-out before saving the data. When the main control unit 3 recognizes the instruction to cancel the erasure of data through the data erasure cancel button 52 or the like, the main control unit 3 drives the optical head 6 to read out the saved data from the area outside the user data area "B" and to write data into the file management data area "A" corresponding to information of the header, so that the file management data are returned. When it is impossible to access the header or to read out the data of the header, the main control unit 3 accesses the backup of the header.

After erasing the data, when the optical disc 2 is taken out from the optical disc recorder 1 and inserted into the optical disc 1 again, the main control unit 3 confirms whether the file management data exist or not. When there is no file management data, the main control unit 3 accesses the header and reads out the saved data based on the information of the header through the optical head 6. The area into which the header is written is searched by tracing back from the location of the temporally lead-out through the areas into which the backup of the header and the saved file management data are written before the temporally lead-out. After returning the saved data, the temporally lead-out is written into the location of it before the data saving based on the information of the header, and thereby the temporally lead-out is renewed (not shown).

According to such a constitution, the file management data saved in the specific area in the optical disc 2 can be returned to the file management data area "A" after erasing the data, so that it is possible to access the user data again with using the returned file management data, and the user can use the user data before the erasure of the data.

Figure 3:
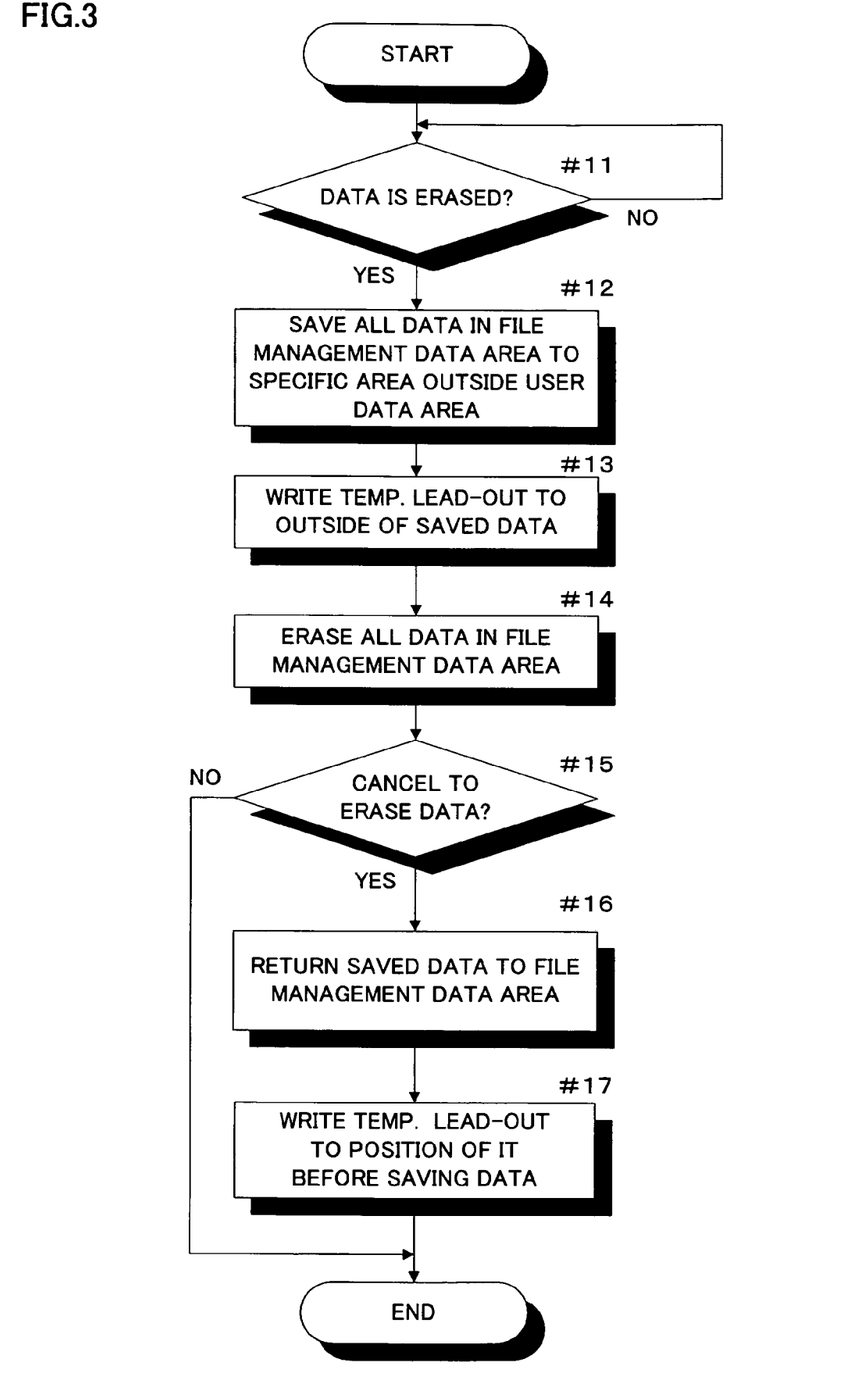
FIG. 3 is a flowchart showing an operation of the above optical disk recorder in the first embodiment when data recorded in the optical disk is erased.

FIG. 3 shows the operation when the optical disk recorder 1 erases data recorded on the optical disk. When the power of the optical disk recorder 1 is turned on and the user inserts the optical disk 2 into the optical disk recorder 1, the optical disk recorder 1 is put into a standby mode. When the user presses the data erasure button 51 provided in the operation unit 5 or the data erasure key 41 provided in the remote controller 4 or when the user selects the item for erasing the data in the menu picture on the screen of the monitor display apparatus 7 (Yes in step #11), the main control unit 3 reads all data from the file management data area "A" and writes a backup of the read data with the header into an area outside the user data area "B" with using the optical head 6 so as to save the data (#12). When the user does not instruct erasure of the data to the main control unit 3 and to perform the other operation (No in step #11), the optical disk recorder 1 is in a standby mode.

After saving the data in the file management data area, the optical head 6 writes the temporally lead-out showing the terminal position of all the data in the area outside the area where the saved data and the backup of the header are written (#13). After that, all the data in the file management data area "A" are erased (#14).

When the user does not cancel the data erasure instruction after erasure of the data (No in step #15), a series of operations is completed. When the user presses the data erasure cancel button 52 or the data erasure cancel key 42, or when the user selects the item for canceling the data erasure instruction in the menu picture on the screen of the monitor display apparatus 7 (Yes in step #15), the main control unit 3 drives the optical head 6 to read out the saved file management data from the area outside the user data area "B" and to write the file management data the into the file management data area "A" to be returned thereto (#16). Following to return of the file management data, the file the temporally lead-out is written into the area before the data saving (#17). After that, a series of operations is completed. Through the above-mentioned procedure, the user can use the user data before erasure of the data again.

Second Embodiment

Subsequently, an optical disk recorder in accordance with a second embodiment will be described with reference to FIGS. 4A to 4C and 5. The second embodiment is different from the first embodiment in that the file management data is selected from all the read data, and the selected file management data are optimized. The constitution of the optical disc recorder in the second embodiment is substantially the same as that in the first embodiment shown in FIG. 1. Thus, the description of it is omitted.

Figure 4A:
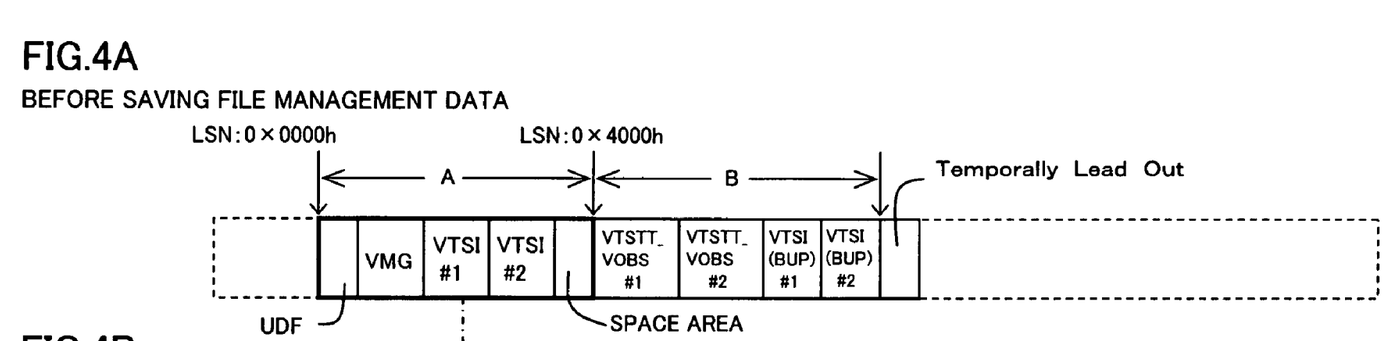
FIGS. 4A to 4C are diagrams each showing a data structure in an optical disk (DVD+RW) used in the above optical disk recorder in accordance with a second embodiment of the present invention.

FIG. 4A shows a data structure in the DVD+RW in the VR mode after the user records, for example, two titles of video information. The file management data is formed of UDF as file system information, VMG as control information of the whole optical disk and VTSI#1, #2 as control information of each title of video data, and is stored into the file management data area "A". The user data formed of VTSTT_VOBS#1, #2 as video information and VTSI (BUP)#1, #2 as backups of the VTSI#1, #2 is recorded into the user data area "B". The temporally lead-out which shows the terminal position is further written at the terminal position of all the data.

Figures 4B, 4C:
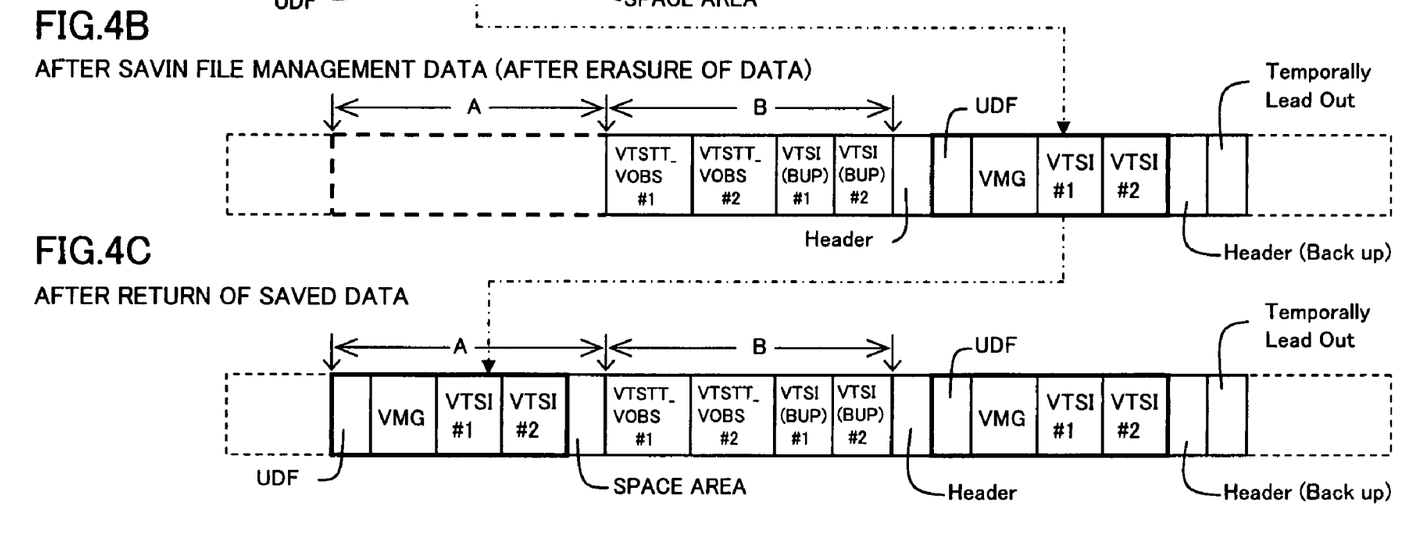

FIG. 4B shows a data structure in the optical disk 2 after the file management data is saved. The ROM 26 stores a program for selecting usable file management data further to operation programs of the main control unit 3. When the user operates the data erasure button 51 or the data erasure key 41 or when the user selects the item for erasing the data in the menu picture on the screen of the monitor display apparatus 7, the main control unit 3 recognizes the instruction of erasure of data. Prior to erasing the data, the main control unit 3 drives the optical head 6 to read out the data from the file management data area "A". Furthermore, the main control unit 3 serving as a data selection means selects the effective or available file management data among the read data. The effective file management data includes VTSI for managing usable user data, VMG, file system data, and so on. Data which are not selected include information relating to unusable user data and file management data thereof due to overwriting or erasure and information in the space area. According to such a selection of the effective file management data to be saved, a capacity of an area into which the effective file management data are saved can be decreased.

Among the selected file management data, the divided file management data which manages the same user data is optimized by the main control unit 3. The main control unit 3 drives the optical head 6 to record the header and the optimized file management data and the backup of the header on the temporally lead-out which is located outside the user data area "B" on the optical disc 2, thereby saving the file management data. The optical head 6 further writes a new temporally lead-out at a location outside the area where the file management data are saved. After saving the file management data, the main control unit 3 drives the optical head 6 to erase all the data in the file management data area. With such a configuration, even when a person other than the user instructs erasure of the data to the optical disk recorder 1 and the data in the file management data area "A" is erased, since the file management data is saved, the user data can be used with using the saved file management data again. Furthermore, since the file management data are saved in the specific area on the optical disc 2, the saved file management data can be returned until the specific area is overwritten by new data. Still furthermore, the file management data is saved in the specific area of the same optical disc 2, so that another recording medium for saving the file management data is not needed, and thereby cost reduction of the optical disc recorder 1 due to reduction of number of elements constituting the optical recorder 1 can be realized.

FIG. 4C shows a data structure in the DVD+RW in the VR mode after the file management data is returned. Header information recorded in the area outside the user data area "B" includes addresses of the file management data area "A", and an address of the temporally lead-out before saving the file management data. The main control unit 3 drives the optical head 6 to read out the saved file management data from the specific area outside the user data area "B" based on the header information, and to write the read file management data into the file management data area "A" thereby returning thereto. After returning the saved file management data, a temporally lead-out is written at the position thereof before saving the file management data based on the information of the header, thereby renewing the temporally lead-out (not shown). Thus, even after erasure of the data, on the basis of the returned file management data, the user data before erasure can be used again.

Figure 5:
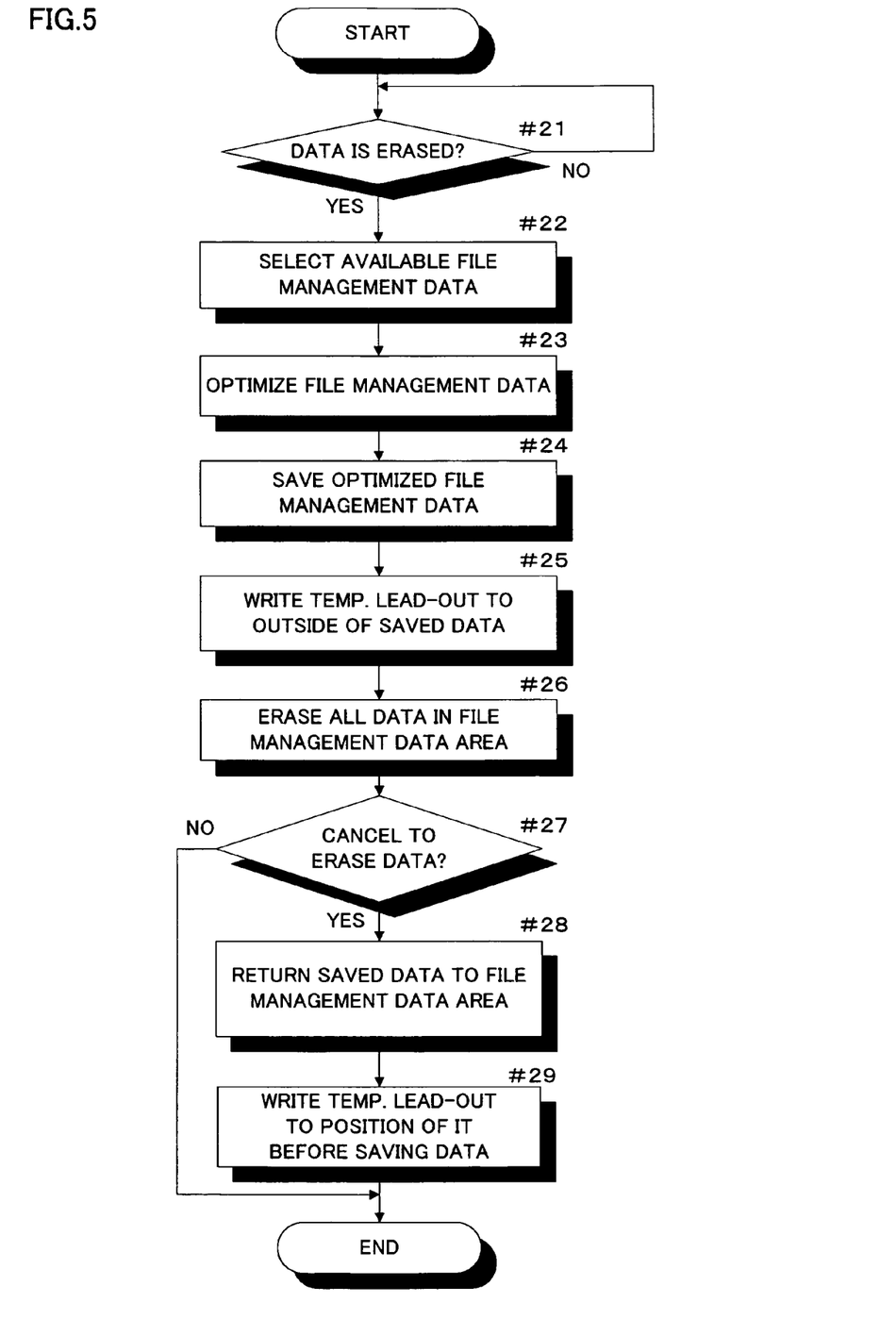
FIG. 5 is a flowchart showing an operation of the optical disk recorder in the second embodiment when data recorded in the optical disk is erased.

FIG. 5 shows an operation of the optical disk recorder 1 when the data recorded in the optical disk is erased. When power of the optical disk recorder 1 is turned on and the user inserts the optical disk 2 into the optical disk recorder 1, the optical disk recorder 1 is put into a standby mode. When the user issues the data erasure instruction to the main control unit 3 (Yes in step #21), the main control unit 3 drives the optical head 6 to read out the data from the file management data area "A" and selects effective file management data from the read data (#22). Thus, only necessary data can be picked out and saved without saving unnecessary data, thereby reducing size of the data to be saved. When the user does not instruct data erasure to the main control unit 3 and perform other operations (No in step #21), the optical disk recorder 1 is in the standby mode.

The main control unit 3 optimizes the selected file management data (#23). A program for optimizing data is incorporated into the ROM 26 which stores the operation program of the main control unit 3 therein. Since the DVD-RW is a rewritable optical disk, data can be rewritten up to a certain number of times. In the rewriting, new file management data may be written over the written file management data. When sizes of both data are different from each other and the size of the new file management data is larger than that of the previous file management data, different data may be written at another location. The same applies also when the new file management data is written in a space area. In such a case, the file management data concerning the same user data is divided and stored in the file management data area. The main control unit 3 serving as a data optimization means combines the divided file management data which manages the same user data among the read file management data and optimizes the combined data. Thus, after erasure of the data and return of the file management data, access time to the file management data can be shortened. Furthermore, it is not necessary to access the file management data which is divided and stored in noncontiguous areas.

The main control unit 3 drives the optical head 6 to write the optimized file management data together with the header in the specific area outside the user data area "B" on the optical disc 2 (#24). Thus, even after erasing the file management data from the file management data area "A", the saved file management data in the specific area can be used again by returning the saved file management data into the original file management data area "A". After saving of the file management data, a temporally lead-out showing the terminal position of all the data is written at a position outside the area where the backup of the header and the saved file management data are written (#25). Subsequently, all the data in the file management data area "A" are erased (#26).

When the user does not cancel the data erasure instruction after erasure of the file management data (No in step #27), a series of operations is completed. When the user instructs cancellation of the data erasure instruction to the main control unit 3 (Yes in step #27), the main control unit 3 drives the optical head 6 to read out the saved file management data from the specific area outside the user data area "B" and to write the read file management data into the file management data area "A" based on the information of the header, thereby the file management data are returned (#28). Following return of the file management data, new temporally lead-out is written at the position of it before the saving of the file management data (#29). Through such procedure, the user can use the file management data again before erasure of the data and access to the user data managed by the file management data.

The present invention is not limited to the configuration of the above-mentioned embodiments and can be variously modified so as not to deviate from the scope of the invention. For example, the optical disk 2 is not limited to the DVD+RW and may be a CD-RW, a DVD-RAM or a DVD-RW. The optical disk recorder 1 is not limited to the DVD recorder and may be a DVD+RW drive, a DVD-RW drive, a DVD-RAM drive or a CD-RW drive, which are mounted in electronic equipment such as optical personal computers. The user data written into the optical disk 2 is not limited to video information and may be data such as music, sound or documents.

This application is based on Japanese patent application 2005-265776 filed Sep. 13, 2005 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical disk recorder comprising:
   a data writing means for writing data into an optical disk;
   a data reading means for reading out data from an optical disk;
   a data erasure instruction means, which is operated by a user, to instruct to perform erasure of data of an optical disc to the data writing means; and
   a data erasure instruction cancel means, which is operated by the user, to instruct to cancel the data erasure instruction to the data writing means, wherein
   when the data erasure instruction means instructs to perform erasure of data of an optical disc, the data reading means reads out file management data from the file management data area of the optical disc before erasing of the file management data, the data writing means writes the file management data into a specific area except the file management data area so as to save the file management data, and subsequently the data writing means write predetermined data for erasing the file management data originally written in the file management data area; and
   when the data erasure instruction cancel means instructs to cancel the erasure of the data, the data reading means reads out the file management data saved in the specific area of the optical disc, and the data writing means writes the file management data read out from the specific area into the file management data area where the file management data were originally written.

2. The optical disc recorder in accordance with claim 1 further comprising:
   a data selection means for selecting the file management data among data read from the file management data area; and wherein
   the data writing means writes only the effective file management data into the specific area of the optical disc.

3. The optical disc recorder in accordance with claim 1 further comprising:
   a data optimization means which combines divided file management data which manages a same user data among the file management data read from the file management data area of the optical disc and optimizes the combined data when the file management data concerning the same user data is divided and stored in the file management data area.

4. The optical disc recorder in accordance with claim 1, wherein
   the specific area of the optical disc where the file management data are saved is located outside a terminal position of all user data stored in a user data area of the optical disc.

5. The optical disc recorder in accordance with claim 1, wherein
the data writing means further writes a header, a backup of the header with the file management data into the specific area; and
the header includes data of area in the file management data area where the file management data were written before the erasure of the data, and data of the specific area where the file management data are saved.

6. The optical disc recorder in accordance with claim 5, wherein
the optical disc has a terminal area further to the file management data area and the user data area, which is located outside the user data area and shows a terminal position of all user data; and
when the file management data is saved in the specific area, at least a part of the header and the file management data are overwritten on the terminal area, and information of the terminal area is newly written in an area outside the area where the header and the file management data are written.

7. An optical disk recorder comprising:
a data writing means for writing data into an optical disk;
a data reading means for reading out data from an optical disk having a file management data area into which file management data are written, a user data area into which user data are written and a terminal area showing a terminal position of all user data;
a data erasure instruction means, which is operated by a user, to instruct to perform erasure of data of an optical disc to the data writing means;
a data erasure instruction cancel means, which is operated by the user, to instruct to cancel the data erasure instruction to the data writing means;
a data selection means for selecting file management data among data read from the file management data area; and
a data optimization means which combines divided file management data which manages a same user data among the file management data and optimizes the combined data, wherein
when the data erasure instruction means instructs to perform erasure of data of an optical disc,
the data reading means reads out all data from the file management data area of the optical disc before erasing of the file management data,
the data selection means selects effective file management data among the data read from the file management data area,
the data optimization means optimizes the selected effective file management data,
the data writing means writes the optimized effective file management data with a header, which includes data of area in the file management data area where the file management data were written before the erasure of the data and data of the specific area where the file management data are saved, and information of the terminal area into a specific area located outside the user data area of the optical disc so as to save the file management data, and
subsequently the data writing means write predetermined data for erasing the file management data originally written in the file management data area; and
when the data erasure instruction cancel means instructs to cancel the erasure of the data,
the data reading means reads out the file management data and the header saved in the specific area of the optical disc, and
the data writing means writes the file management data read out from the specific area into the file management data area where the file management data were originally written and write the information of the terminal area into the area where the terminal area was originally located based on the information of the header.

* * * * *